(12) United States Patent
Ady et al.

(10) Patent No.: US 9,094,453 B2
(45) Date of Patent: Jul. 28, 2015

(54) METHOD AND APPARATUS FOR ASSOCIATING MOBILE DEVICES USING AUDIO SIGNATURE DETECTION

(71) Applicant: Motorola Mobility LLC, Libertyville, IL (US)

(72) Inventors: Roger W Ady, Chicago, IL (US); Michael J Lombardi, Lake Zurich, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 14/073,587

(22) Filed: Nov. 6, 2013

(65) Prior Publication Data

US 2015/0127710 A1    May 7, 2015

(51) Int. Cl.
*G06F 15/16*    (2006.01)
*H04L 29/08*    (2006.01)
*G10L 19/00*    (2013.01)

(52) U.S. Cl.
CPC ............... *H04L 67/16* (2013.01); *G10L 19/00* (2013.01); *H04L 67/10* (2013.01)

(58) Field of Classification Search
USPC .................. 709/203, 225, 228, 229, 232, 248
See application file for complete search history.

(56) References Cited

U.S. PATENT DOCUMENTS

| | | | |
|---|---|---|---|
| 6,728,341 B1 * | 4/2004 | Puchek et al. | 379/49 |
| 7,277,766 B1 | 10/2007 | Khan et al. | |
| 2003/0065790 A1 * | 4/2003 | Loveland et al. | 709/228 |
| 2003/0109270 A1 * | 6/2003 | Shorty | 455/517 |
| 2009/0083372 A1 * | 3/2009 | Teppler | 709/203 |
| 2010/0131584 A1 * | 5/2010 | Johnson | 709/203 |
| 2012/0134282 A1 | 5/2012 | Tirronen et al. | |
| 2012/0224711 A1 | 9/2012 | Kim et al. | |
| 2013/0006634 A1 | 1/2013 | Grokop et al. | |
| 2014/0032669 A1 * | 1/2014 | Hughes | 709/204 |
| 2014/0064176 A1 * | 3/2014 | Anchan | 370/312 |
| 2014/0204841 A1 * | 7/2014 | Ruiz Delgado et al. | 370/328 |

FOREIGN PATENT DOCUMENTS

| | | |
|---|---|---|
| AU | 2013200513 B1 | 1/2013 |
| WO | 2012072861 A1 | 6/2012 |

OTHER PUBLICATIONS

International Search Report and Written Opinion from International Application No. PCT/US2014/061758, dated Feb. 2, 2015, 11 pp.

(Continued)

*Primary Examiner* — Michael Y Won
(74) *Attorney, Agent, or Firm* — Shumaker & Sieffert, P.A.

(57) ABSTRACT

One disclosed method of operation includes obtaining audio data from a plurality of mobile devices, comparing the audio data to at least one stored audio signature, and grouping mobile devices that have audio data containing the at least one stored audio signature. The method may further include sending an invitation message to the grouped mobile devices to enable each mobile device to associate itself to the group. The method may also include providing content to the grouped mobile devices, where the content is related to the at least one stored audio signature. Various applications exist for the grouping of mobile devices based on audio signature, one such application being related to identifying social media groups or communities, or other content, which may be of interest to mobile device users.

26 Claims, 5 Drawing Sheets

(56) References Cited

OTHER PUBLICATIONS

Miluzzo, et al., "Sensing Meets Mobile Social Networks: The Design, Implementation and Evaluation of the CenceMe Application," Nov. 7, 2008, pp. 337-350.

Miluzzo, et al., "CenceMe—Injecting Sensing Presence into Social Networking Applications," Nov. 7, 2008, pp. 337-350.

Bao, et al., "VuPoints: Collaborative Sensing and Video Recording through Mobile Phones," MobiHeld '09, Aug. 17, 2009, 6 pp.

* cited by examiner

METHOD AND APPARATUS FOR ASSOCIATING MOBILE DEVICES USING AUDIO SIGNATURE DETECTION

CROSS-REFERENCE TO RELATED APPLICATIONS

None.

FIELD OF THE DISCLOSURE

The present disclosure relates generally to mobile devices and more particularly to voice and audio recognition and more particularly to social networks.

BACKGROUND

Demographic information is used in modern information systems for a variety of purposes ranging from targeted marketing or advertising, civil and municipal planning, funding planning and other uses. Today, social media platforms enable people to form groups or communities based on common interests that by nature define demographics of the users participating in such social media groups or communities. Given the advent of so-called "big data" and related computerized platforms, demographic information may be of further usefulness and may lead to new applications and may also depend on how such information is obtained and collected.

DETAILED DESCRIPTION

The disclosed embodiments provide capabilities for identifying multiple mobile devices across time and locations which are linked by having received a common, similar audio input. The various embodiments include methods of operations for monitoring mobile device audio inputs to identify audio signatures contained within mobile device audio data that match audio signatures stored in a database or that match an audio signature obtained from at least one of the mobile devices and that may be used to identify other mobile devices receiving the same or similar audio. Therefore demographics may be generated based on the common audio profiles of mobile devices. Various applications of the demographic information will occur to those of ordinary skill. In one example application, mobile device users may connect using social media based on finding other mobile device users that are potentially in a given interest demographic based on similar audio signatures such as, but not limited to, media file audio signature, or the audio signatures of other audio related "events" as defined herein. In other example applications, content may be provided to mobile devices based on groupings, where the content is related to the group or, more particularly, to the common audio signature detected in audio data received from the mobile devices.

In one embodiment, a method of operation includes obtaining audio data from a plurality of mobile devices, comparing the audio data to at least one stored audio signature, and grouping mobile devices that have audio data containing the at least one stored audio signature. In some embodiments, the method may further include sending an invitation message to the grouped mobile devices to enable each mobile device to associate itself to the group. In some embodiments, the method may further include providing content to the grouped mobile devices, the content related to the at least one stored audio signature.

In some embodiments, the method may further include obtaining context information from each mobile device that has audio data containing the at least one stored audio signature, and subdividing at least one group of mobile devices based on the context information. Obtaining context information may be accomplished, in some embodiments, by obtaining at least one of timestamp information from the audio data of each mobile device, or location information from the mobile devices providing the audio data. The obtained location information is related to a location where the audio data was collected by the respective mobile device. In some embodiments, the method may further include accessing a database to obtain the at least one audio signature.

In some embodiments, the method may further include associating the at least one audio signature with an event, creating a group for the event on a social media platform, and sending the invitation message to the grouped mobile devices from the social media platform. Associating the at least one audio signature with an event may be accomplished, in some embodiments, by associating the at least one audio signature with at least one of a live event, a recorded version of the live event, a broadcast version of the live event, or playback of an audio file. In some embodiments, one or more groups may be subdivided based on the event. For example, groups may be subdivided based on timestamp information from the audio data, or location information from the mobile devices providing the audio data where the location information is related to a location where the audio data was collected.

In another embodiment, a method of operation includes obtaining audio data from a plurality of mobile devices, identifying an audio signature within the audio data of at least a first mobile device of the plurality of mobile devices, comparing the audio data of at least a second mobile device, of the plurality of mobile devices, to the identified audio signature, detecting the identified audio signature within the audio data of the second mobile device based on a match between the identified audio signature and at least a portion of the audio data of the second mobile device, and grouping the first mobile device and the second mobile device based on both the first mobile device and the second mobile device having the identified audio signature within respective corresponding audio data.

In some embodiments, the method may further include sending an invitation message to the first mobile device and the second mobile device, where the invitation message is to enable the first mobile device and the second mobile device to communicate using a social media server. In some embodiments, the method may further include providing content to the first mobile device and the second mobile device, the content related to the identified audio signature.

The disclosed embodiments also provide a server that includes at least one processor and memory operatively coupled to the processor. The memory contains executable instructions for execution by the processor, where upon executing the executable instructions the processor is operative to perform any of the methods of operation described herein as being related to the server.

Figure 1:
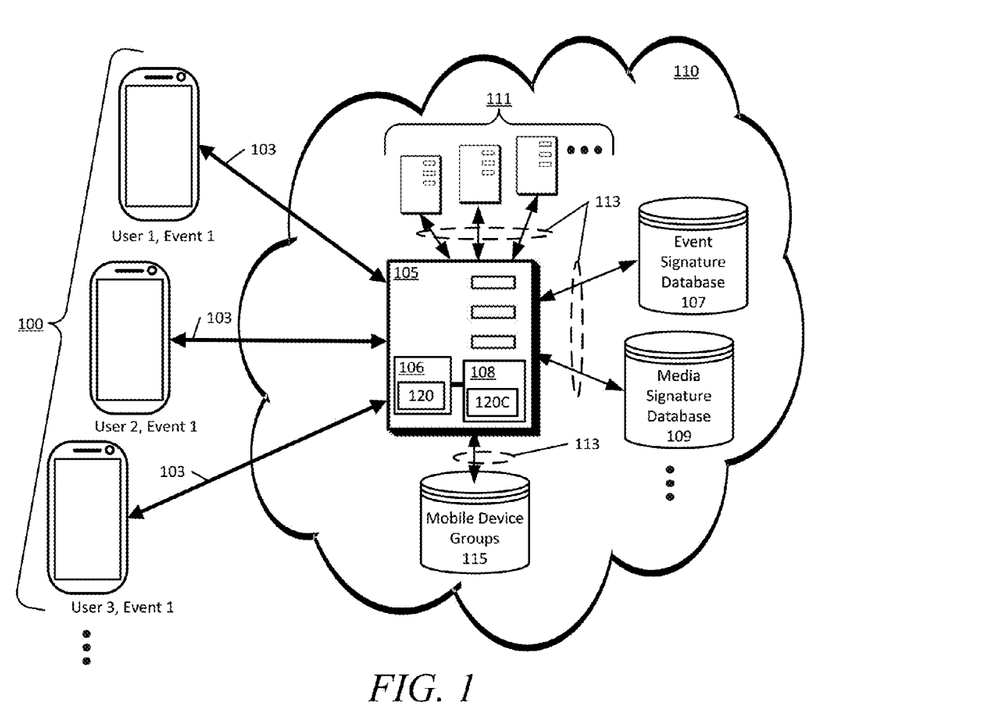
FIG. 1 is a block diagram of a server communicating with mobile devices to obtain audio samples related to various events in accordance with the embodiments.

Turning now to the drawings, FIG. 1 is a block diagram of a server 105 that is operative to communicate with various mobile devices to obtain audio samples related to various events. In accordance with the embodiments, the server 105 is located within a network, such as the Internet 110, and is accessible by various types of mobile device by Internet connectivity 103. For example, a group of mobile devices 100 has Internet connectivity 103 and are each capable of establishing a connection to the Internet 110 and to the server 105 to perform the methods of operation in accordance with various embodiments. The server 105 may further be integrated with, or operatively coupled to, various databases such as event signature database 107, media signature database 109 and mobile device groups database 115. The server 105 may access and communicate with the various databases using an appropriate database access protocol 113. However, the database access protocol used to access the various databases may be different in some embodiments. The server 105 may also access and communicate with various social media or content servers 111.

In accordance with the embodiments, the server 105 includes at least one processor 106, and a nonvolatile, non-transitory memory 108 that is operatively coupled to the at least one processor 106. The non-volatile, non-transitory memory 108 stores executable instructions (executable code) 120C for a grouping application 120. The processor 106 is operative to access the memory 108 and to execute the executable instructions 120C stored therein in order to implement the methods of operation of the grouping application 120.

In accordance with the embodiments, each mobile device that may access the server 105 includes an always-operating audio detection system. The always-operating audio detection system is operative to detect voice commands and to route those voice commands appropriately as control signals to either mobile device applications, components, or to the Internet in order to provide various mobile device features and functions. In accordance with the embodiments, the always-operating audio detection system also sends audio data to the server 105 over the mobile device's Internet connectivity 103. In some embodiments, mobile devices will establish an Internet connection with the server 105 only as needed, periodically in order to send the audio data. In other embodiments, mobile devices will maintain an Internet connection to the server 105 at all times even though the mobile devices may only send the audio data to the server 105 periodically.

The grouping application 120 obtains the audio data from the various mobile devices and examines the audio data for various audio signatures. This may be accomplished by either making comparisons of received audio samples with known audio signatures stored in the event signature database 107 or media signature database 109, or by comparing audio samples from various mobile devices to detect matching patterns of audio signatures. The mobile device groups database 115 may be used by the grouping application 120 to keep track of the various mobile devices that are actively sending audio data, and to assign groups based on detected audio signatures. An "audio signature" may be an acoustic fingerprint that enables audio database searching and identification of audio samples contained in the audio data. Various techniques for creating such acoustic fingerprints, as well as for database search and comparison with audio data, are known to those of ordinary skill and such techniques are therefore not described in detail herein.

The mobile device groups database 115 may be considered a demographics database. That is, the mobile device groups formed and tracked in the database may be used to provide statistical insights into activities of mobile device users. For example, the collected audio data might indicate the time of day mobile device users are near a radio or television set, in a crowd, or consuming some type of audible media content. In one specific example, the audio data might indicate how many mobile device users were in hearing range of an audio advertisement. Many other applications of the disclosed embodiments will occur to those of ordinary skill in light of the present disclosure and the examples provided herein.

The event signature database 107 contains audio signatures for various types of known events for which audio data has been previously collected. Acoustic fingerprints have thus been generated to facilitate searchable "event signatures." For example, the event signature database 107 may contain audio signatures for events such as a football game (crowd noise or other characteristic audio), an outdoor music concert, and indoor music concert, public speaking event or various other such events for which audio signatures may be collected and stored. The media signature database 109 may contain stored audio signatures associated with broadcasting some of the event signature database 107 events over media such as television, radio, the Internet, etc. One example may be a musical logo played during a football game, etc. Additionally, the media signature database 109 will contain audio signatures for various media files such as, but not limited to, television shows, movies, concerts, songs files such as compact disc albums, MP3 files, MP4 files or any other type of media file that may include an audio component.

Put another way, the event signature database 107 contains audio signatures that are somewhat generalized to a given environment while the media signature database 109 contains audio signatures more directed to media content (such as, but not necessarily, copyrighted audio content). Thus the grouping application 120 may examine audio samples received in the audio data, by comparing the audio samples with audio signatures stored in the event signature database 107 or the media signature database 109.

In some embodiments, the grouping application 120 may also compare audio samples from various mobile devices and group mobile devices based on common audio signatures contained in the audio samples, even if no matching database entry exists for the audio signatures. Additionally, the grouping application 120 may also build the event signature database 107, or the media signature database 109 in some embodiments, by generating (from received audio samples) and storing audio signatures that occur commonly at geographic locations, time periods, or combinations of both. Geographic coordinate data and timestamps may be obtained by the server 105 along with the audio data or may be obtained as requested by the server 105 based on a "context request." That is, the grouping application 120 may include audio signature generation code. However, in some embodiments, the audio signature generation may be performed by a separate application residing either on the server 105 or on the individual mobile devices. Thus, in some embodiments, the mobile devices may send an audio signature created from audio data at a given time and location, rather than sending the raw audio data to the server 105.

If the grouping application 120 identifies one of the stored audio signatures within the audio data of any mobile device, then the grouping application 120 will create a database entry for that mobile device in the mobile device groups database 115. The grouping application 120 may then perform an action that invites the user of the respective mobile device to join a group based on a grouping identified by the grouping application 120. For example, the mobile devices shown in FIG. 1 may be associated with the mobile device group 100 based on each of the mobile device having obtained audio (and provided the server 105 with an audio sample) that contained an audio signature related to "Event 1." However, in other embodiments, the grouping will be for demographic purposes and will not include sending any invitation message or other notification to the mobile devices.

In accordance with the embodiments, the audio signature related to "Event 1" need not be obtained by a mobile device at the same time or place as other mobile devices in order to be associated with the mobile device group 100. For example, user 1 and user 2 may have attended a live concert (i.e. a live version of Event 1), while user 3 may have watched and listened to either a broadcast or a recording of the live concert on television, the Internet, or by radio. That is, the user 3 mobile device may have sampled audio containing the Event 1 audio signature at a different time and different place from the actual time and place of the live concert. In accordance with the embodiments, the grouping application 120 would nevertheless associate the mobile device of user 3 as a potential member of the mobile device group 100 related to Event 1. The grouping application 120 may also send the mobile device of user 3 an invitation to join the mobile device group 100. In other words, mobile devices are grouped based on having received audio containing a like audio signature, regardless of where or when the audio was received by the mobile devices. Examples of messages and information flows between an example mobile device 200 and the server 105 are provided in FIG. 2.

Figure 2:
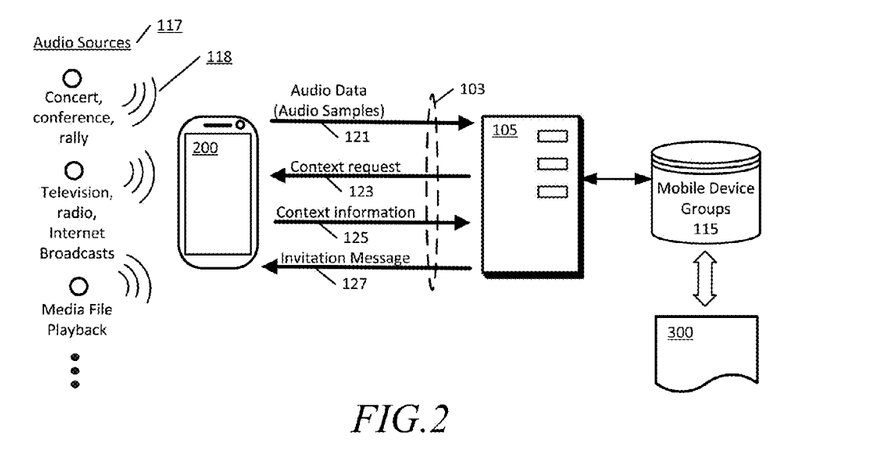
FIG. 2 is a block diagram of messages and information flows between a mobile device and the server shown in FIG. 1, in accordance with the embodiments.

Various audio sources 117 may provide sound waves 118 to the example mobile device 200. Example audio sources 117 include, but are not limited to, a concert, conference, rally, television broadcast, radio broadcast, Internet broadcast, or media file playback via a media file player, the Internet, etc. Thus, sound waves 118 provided by the various audio sources 117 may contain audio signatures related to an "event" (concert, television broadcast, sporting event, political rally, television show, seminar, movie, nightclub, party, religious service, classroom, bus ride, wedding service, etc.) or audio signatures related to a media file.

In one example, an audio signature corresponding to a sound logo or musical pattern may be stored on either the event signature database 107 or the media signature database 109. For example, an audio signature corresponding to a musical pattern or segment used in beginning a football game such as an introduction to an NFL® broadcast may be stored. This introductory musical pattern may be received by mobile device 200 on Sunday as well as by other mobile devices that may be located at various places all across the country. The mobile device 200 will send audio data 121 to the server 105, via Internet connectivity 103, which includes an audio sample having all, or a part of, the audio signature for the musical pattern. The grouping application 120 may then compare the mobile device audio data 121 with audio signatures contained in the event signature database 107 and the media signature database 109. Upon detecting a matching audio signature, the grouping application 120 may request context information by context request 123. The mobile device 200 may then provide the context information 125 which may include location information such as GPS coordinates. In other embodiments, a timestamp, location stamp, or both may be provided along with the audio data 121. That is, in some embodiments, the context information 125 may be provided automatically without the need for the context request 123. However, mobile device 200 privacy settings may determine whether or not such context information 125 is sent to the server 105 in some embodiments where context information 125 may be sent either automatically or in response to the context request 123.

Also, after detecting a matching audio signature, the grouping application 120 may either check the mobile device groups database 115 for existing groups related the audio signature or may create a new group. The mobile device 200 will be added to grouping table 300 that is used to keep track of detected audio signatures so that groups may be created and so that, in some embodiments, group invitations may be sent to appropriate mobile devices. Thus if a group exists, or is created, in the mobile device groups database 115, an invitation message 127 may be sent from the server 105 to the mobile device 200 in some embodiments so that the mobile device 200 user may join the group.

The group may be a "community" related to one of the various social network servers 111 or may be related to determination of some other demographic information. Thus in the example, a community may exist on a social network server for NFL® fans or for fans of the particular NFL® football teams known to have been playing on the particular day on which the audio signature matches were detected. In this example, the invitation message 127 may thus be sent and may therefore include information about an NFL® virtual social community based on the NFL® related audio signature obtained by the mobile device 200.

Therefore in the various embodiments, mobile devices include an always-operating audio detection system to listen for audio signatures that match audio signatures stored in a database. When matching audio signatures are identified by the server 105, the mobile device is added to a grouping table 300 and may be placed into an existing group or a pending group (i.e. waiting for a pre-specified number of members, etc.). In some embodiments, for existing groups, the mobile device may be sent an invitation message that the mobile device may display in a low power mode without waking the mobile device. In such embodiments, the mobile device user may choose to join the group or community, or to receive content, based on the displayed invitation message. For example, joining a given group or community enables the user to interact with other mobile device owners who are listening to, or have some interest in, the same broadcast, media file, etc. In other words, the mobile device always-operating audio detection system is used to identify users engaged in a common event, or having a common interest, by monitoring ambient audio and looking for audio signature matches across devices. Joining a group or community may require that the user has an account on one of the social media or content servers 111 that hosts the group or community or that provides the related content.

In some embodiments, mobile devices may sample and store, such as in a memory cache, audio for upload to the server 105 at pre-determined intervals. The server 105 may access one or more social media servers of the social media or content servers 111 to initially create groups using platforms such as, but not limited to, Google+®, Twitter®, Facebook®, or other social connection such that mobile device users may opt-in and share comments, ratings, images, etc. with the group or "virtual community". The context information 125 may include location data which may be used by the server 105 to create grouping associations for mobile devices with some predetermined proximity or that are physically present at an "event" or within a given geographic region such as a certain state, city, etc. The context information 125 may thus be used to collect demographic information as it relates to geography. The server 105 may only consider mobile devices to form a potential "group" based on a predetermined threshold for a required minimum number of users that are participating in the same event. Once the threshold is reached, the server 105 may proceed to send mobile devices an invitation message 127 to join a related community or to access related content from a content server, etc. The mobile device users may then opt to join the group or community or to access the related content. Thus the methods of operation of the various embodiments can connect people at different locations engaged in the same event or having the same interests (taste in music, sports, etc.) regardless of the time or location at which the user "heard" the audio signature related to the group. In other embodiments, the methods of operation can enable content delivery based on related interests. Other applications of the embodiments may occur to those of ordinary skill in light of the disclosure and examples provided herein.

Figure 3:
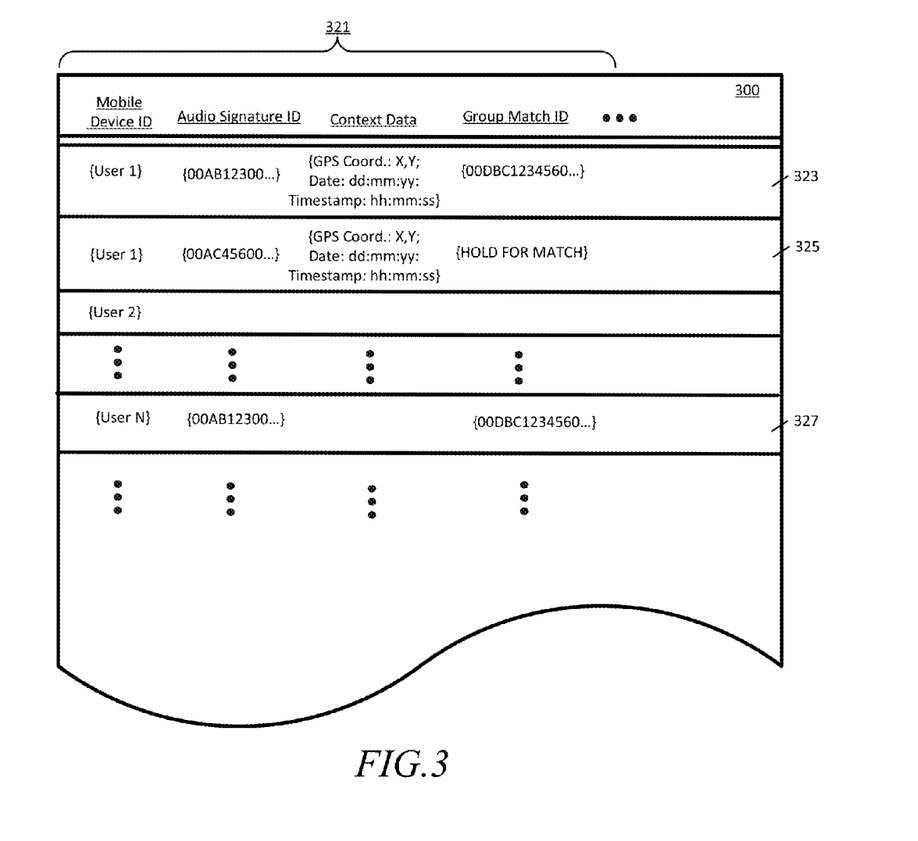
FIG. 3 is an example table contained in a mobile device groups database in accordance with some embodiments.

Example details of the grouping table 300, stored in the mobile groups database 115 is shown in FIG. 3. The server 105 may use the grouping table 300 to keep track of various mobile devices as it receives corresponding, respective audio data from each mobile device. The example grouping table 300 includes columns 321 including "mobile device ID," "audio signature ID," "context data," and "group match ID." The mobile device ID column provides identification for the user of the respective mobile device so that an invitation message may eventually be sent to that mobile device. However, in some embodiments, audio data may be collected without information that would specifically identify the user other than timestamps, location information or both. That is, for demographic information purposes, the specific identity of the mobile device users may not be needed. However, some unique identification number may be assigned to a mobile device in order to recognize the mobile device so as to prevent duplicate entry of data in the grouping table 300. Example row 323 shows example information for "user 1." An audio signature ID may be assigned for a specific audio signature detected by the grouping application 120 within the user 1 mobile device audio data. If the audio signature, based on the audio signature ID, matches an audio signature for a given group, the row 323 will include the group match ID as shown. The example audio signature ID and group match ID are both shown as hexadecimal values for purposes of illustration but could be any type of computer storable value that may be used as an identifier. In some embodiments, the grouping application 120 of server 105 may request context information from a given mobile device. This information will then be stored as context data in a context data field as shown which may include GPS coordinates, date and timestamp corresponding to the audio signature as well as other information such as calendar entries from the mobile device. However in other embodiments, some context information such as timestamp, location information, or both, etc. may be included along with the audio data and therefore do not need to be specifically requested by the server 105.

Some mobile devices may have multiple row entries in the grouping table 300. For example, user 1 has a second row 325 entry for an identified audio signature that does not yet have a group match ID. This may occur, for example, if a threshold number of users have not been found having the matching audio signature ID, or for other reasons such as in the case of user initiated groups. In some embodiments, the user may define a group and then provide audio data related to an "event" for the defined group. For example, the audio signature ID in row 325 for user 1 may be such an audio signature. In this example, if an audio signature does not already exist, an audio signature may be generated either by an application residing on the mobile device, or on the server 105. The group match ID may then be in a hold situation until at least another mobile device, or some threshold number of mobile devices, that have a matching audio signature are identified. The grouping table 300 entries therefore continue to row 327 for "N" number of user mobile devices. In some embodiments, a mobile device row entry may be removed from the grouping table 300 for various reasons such as after an invitation message is sent to that mobile device by the server 105.

Figure 4:
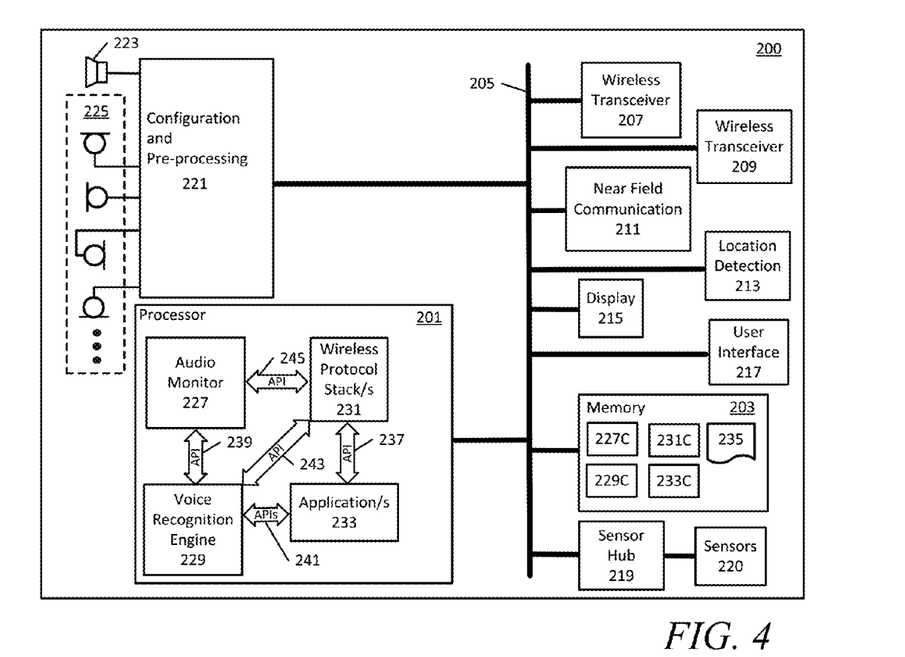
FIG. 4 is block schematic diagram of a mobile device in accordance with the embodiments.

A schematic block diagram showing example details of the mobile device 200 is provided in FIG. 4. In accordance with the embodiments, the mobile device 200 includes an audio monitor 227. The audio monitor 227 may be implemented as software or firmware (or a combination of software and firmware) executing on one or more processors, and may also include, or may be implemented independently, using ASICs (application specific integrated circuits), DSPs (digital signal processors), hardwired circuitry (logic circuitry), or combinations thereof. That is, the audio monitor 227 may be implemented using an ASIC, DSP, executable instructions executing on a processor, logic circuitry, or combinations thereof.

In the example of FIG. 4, the audio monitor is implemented as executable instructions 227C stored in memory 203 and executed by processor 201. An internal connection bus 205 provides operative coupling between the processor 201 and the other various mobile device 200 components. As used herein, components may be "operatively coupled" when information can be sent between such two components, even though there may be one or more intermediate or intervening components between, or along the connection path. Therefore, any of the various components connected to the internal connection bus 205 may be understood herein to be operatively coupled to the processor 201 or to each other where appropriate. Operative coupling may also exist between modules or components implemented as software or firmware executing on a processor and such "software coupling" may be implemented using libraries or application programming interfaces (APIs) or other software interfacing techniques as appropriate. Such libraries or APIs are shown illustrated as providing operative coupling between various software implemented modules or components in FIG. 4.

The memory 203 is a non-volatile, non-transitory memory, and stores the executable instructions 227C corresponding to the audio monitor 227, executable instructions 229C corresponding to a voice recognition engine 229, executable instructions 231C corresponding to one or more wireless protocol stacks 231, executable instructions 233C corresponding to one or more applications 233, an Internet Protocol (IP) stack (not shown), a mobile device operating system (not shown), libraries (not shown) used to implement various APIs, and audio data 235 that may be stored from time-to-time prior to sending it to the server 105. The processor 201 is operative to access the memory 203 and execute the stored executable instructions 227C, 229C, 231C, 233C stored in memory 203, to perform the methods of operation disclosed herein as well as to perform other functions and operations such as running the mobile device 200 operating system, etc.

The mobile device 200 includes one or more microphones 225 (such as a microphone array) and a speaker 223 that are operatively coupled to configuration and pre-processing logic 221. The configuration and pre-processing logic 221 may include analog-to-digital converters (ADCs), digital-to-analog converters (DACs), echo cancellation, high-pass filters, low-pass filters, band-pass filters, adjustable band filters, noise reduction filtering, automatic gain control (AGC) and other audio processing that may be applied to filter noise from audio received using the one or more microphones 225. The configuration and pre-processing logic 221 may be a single component as shown in FIG. 4 or may be implemented partly in hardware and partly in software or firmware executed by processor 201. In some embodiments, the configuration and pre-processing logic 221 may be implemented using several hardware components and may also utilize one or more software or firmware components in various combinations. The configuration and pre-processing logic 221 may be operative to control the one or more microphones 225 to turn certain microphones on or off or to adjust filtering or gain for purposes of various applications.

The wireless transceiver 207 may provide wireless communication capabilities for one or more wide area network communications systems such as, but not limited to, Wi-Fi cellular, 2G, 3G or 4G wireless communications systems and also provides the Internet connectivity 103 over the wireless interface to communicate with the server 105. In some embodiments, a second wireless transceiver 209 may also be present in the mobile device 200. The second wireless transceiver 209 may be a peer-to-peer transceiver and may provide wireless connectivity capabilities such as, but not limited to, Bluetooth™, Wireless USB, ZigBee, or other technologies, etc. In some embodiments, the second wireless transceiver 209 may also provide Internet connectivity 103. Some embodiments of the mobile device 200 may also include near field communication (NFC) logic 211 that is operative to communicate with external NFC devices to provide information or to read information into the mobile device 200.

Location detection logic 213 may include global positioning system (GPS) hardware and is operative to provide location coordinate data such as, but not limited to, GPS coordinates to the processor 201 and to various applications 233. The user interface (UI) 217 may include a track ball mouse, touch sensitive elements, physical switches, gyroscopic position sensors, etc. Some of the UI 217 sensors may be included in a group of sensors 220. In some embodiments, the sensors 220 may be operatively coupled to a sensor hub 219 where the sensor hub 219 is further operatively coupled to the internal connection bus 205. The sensor hub 219 may be operative to provide monitoring and data conversion functions for data received by the various sensors 220 and provide sensor data to the processor 201. For example, some of the sensors 220 may be used by the UI 217 to receive user inputs. For example, the sensors 220 may include the gyroscopic position sensors or accelerometers that are used to determine the position of the mobile device 200 to facilitate various forms of user input for various applications 233 when a user moves the mobile device 200 into various positions. In one example, the display 215 may be adjusted by sensing the position of the mobile device 200 as being horizontal or vertical. The sensors 220 may also include thermal sensors and other sensors that may be used by the processor 201 or various applications 233 to adjust parameters of the mobile device 200 or for other purposes. The display 215 may provide a touchscreen capability that is part of the UI 217, and may also provide a graphical user interface (GUI) related to a mobile device operating system, a GUI related to one or more mobile device applications 233 or both. The display 215 may therefore be considered part of the UI 217 in that it may be operative to receive command and control signals directly by touch.

The audio monitor 227 is operative to obtain audio samples from the configuration and pre-processing logic 221 and to from time-to-time send the audio samples to the server 105. The audio samples may be stored as audio data 235 in memory 203 until a pre-determined time interval at which the audio data 235 may be sent to the server 105. The audio monitor 227 may operate at the application layer of an IP protocol stack (not shown) executed by the processor 201 to facilitate IP communications. An API 245 enables the audio monitor 227 to communicate with one or more wireless protocol stacks 231 to send audio data 235 to, and to receive request messages from, the server 105 over a wireless interface using either wireless transceiver 207 or wireless transceiver 209. Other APIs such as API 243 enable the voice recognition engine 229 to send voice recognition information over networks using either wireless transceiver 207 or wireless transceiver 209. One or more applications 233 such as, but not limited to, web browsers, email programs, etc., may also wirelessly communicate with the Internet or other networks by way of API 237. APIs 241 enable voice control and command of the various applications 233 by the voice recognition engine 229 and may also interface with the mobile device operating system (not shown). In some embodiments, the audio monitor 227 may also provide information to, or receive information from, the voice recognition engine 229 by an API 239. The audio monitor 227 may operate even when the mobile device 200 is placed in a low power mode, such as a sleep state, and may wake the mobile device 200 depending on voice commands detected by the voice recognition engine 229. The audio monitor 227 and the voice recognition engine 229 may be integrated into a single component in some embodiments such that the API 239 is not required. In some embodiments, the audio monitor 227 may include an audio signature generation tool that can generate an audio signature from one or more audio samples. The audio monitor 227 may in this case, send a generated audio signature to the server 105 rather than the entire one or more audio samples. The server 105 may then store the generated audio signature in a database and search for the audio signature in the audio data of other mobile devices. Examples of methods of operation of the audio monitor 227 are described below with respect to flowcharts in FIG. 6 through FIG. 9.

Any of the above described components of mobile device 200 may be implemented as software or firmware (or a combination of software and firmware) executing on one or more processors, or using ASICs, DSPs, hardwired circuitry (logic circuitry), FPGAs (field programmable gate arrays) or combinations thereof. Therefore the mobile device 200 illustrated in FIG. 4 is one example of a mobile device and is not to be construed as a limitation on the various other possible mobile device implementations that may be used in accordance with the various embodiments.

The various embodiments also include non-volatile, non-transitory computer readable memory, other than memory 108 or memory 203, that may contain executable instructions (i.e. executable code), for execution by at least one processor, that when executed, cause the at least one processor to operate in accordance with the functionality and methods of operation herein described. The computer readable memory may be any suitable non-volatile, non-transitory, memory such as, but not limited to, programmable chips such as EEPROMS, flash ROM (thumb drives), compact discs (CDs) digital video disks (DVDs), etc., that may be used to load executable instructions or program code to other processing devices such as servers, mobile devices or other devices such as those that may benefit from the features of the herein described embodiments. For example, executable instructions 120C or executable instructions 227C may be stored on any of the above described forms of computer readable memory, etc.

Figure 5:
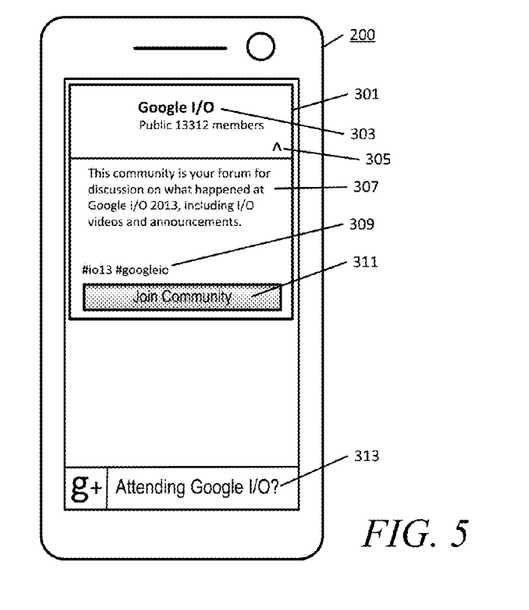
FIG. 5 is diagram of a mobile device showing an example display of an invitation message sent to a mobile device by a server in accordance with an embodiment based on the mobile device providing an audio sample containing a certain audio signature.

The diagram of FIG. 5 provides one example of an invitation message that may be sent to mobile device 200 by the server 105 in accordance with an embodiment. Those of ordinary skill in the art will understand that various other forms of notification such as, but not limited to, text messages, e-mail messages, or other types of notifications may be sent, and that various other social media platforms, content servers, etc. may be used in accordance with the various embodiments. That is, the examples provided by FIG. 5 are not to be construed as any limitation to the particular type of invitation message or invitation mechanism that may be used to invite a user of a mobile device to a group in accordance with the various embodiments.

Per the example of FIG. 5, the mobile device 200 has received audio through its one or more microphones, and has sampled the audio to obtain audio data. The mobile device 200 in the FIG. 5 example has also periodically sent the audio data to the server 105 in order for the grouping application 120 to look for matching audio signatures. An audio signature was detected by the grouping application 120 that matched either a stored audio signature stored within the event signature database 107 or the media signature database 109, or that matched other mobile device audio signatures that were located at a given location at a given time. For example, various mobile devices may have been carried by users attending the "Google I/O" event. In that case, the grouping application 120 may have interacted with one or more social media or content servers 111 that already had a group associated with the Google I/O event. The grouping application 120 may have detected audio signatures in audio data received from the audio monitor 227 of various mobile devices that matched with an event signature for a conference based on, for example, a crowd noise audio signature contained in the various mobile device audio data that matched a conference crowd noise audio signature contained in the event signature database 107.

Based on detecting the crowd noise audio signature, the grouping application 120 may have requested and received "context information" which may include mobile device calendar appointments, location information, or both depending on individual mobile device privacy settings for the audio monitor 227. In some embodiments, the grouping application may also receive location information from the mobile devices along with the audio data as well as timestamp information and may thus make the inference that mobile devices are present at the Google I/O event. In other words the grouping application 120 may assume or infer that since the mobile devices are at or near the location coordinates of the Google I/O event, and have sent the matching audio signatures (such as crowd noise) that have timestamps at or during the known time of the event, such mobile devices are likely to be present at the Google I/O event.

Thus an invitation message 301 may be received by the mobile device 200 and displayed. The example invitation message 301 is a notification message and may include a group or community name 303. In other embodiments, the invitation message 301 may provide a link to content related to the event such as, but not limited to, agendas, maps, schedules, coupons, advertisements, or other content, etc. Initially, in some embodiments, only a grouping query 313 may be shown which allows the user to select the grouping query 313 to respond or to obtain further information. That is, the user may see a query such as "Attending Google I/O?" The user may then make a selection with respect to the grouping query 313 and may respond "yes" or "no." If the user responds "no," then the grouping query 313 will disappear from the mobile device 200 display. However, if the user answers "yes," then a further notification message may appear on the mobile device 200 display. The grouping query 313 may also expire after a certain period of time (such as after the conference adjourns) and may be automatically deleted or cleared from the mobile device 200 at that time.

The invitation message 301 may initially show only the group or community name 303 and may be expandable by clicking on an expansion-contraction arrow 305. Expanding the invitation message 301 may reveal the group description 307, and hash tags 309 associated with the group and which may correspond to the social media platform associated with the invitation message 301. A "join" button 311 may also be displayed to enable the user to join the group or community. If the user does not wish to join the group or community, the user may close the invitation message 301, for example by selecting the expansion-contraction arrow 305 again and may also clear the invitation message 301 using methods of operation known by those of ordinary skill. The invitation message 301 may also be automatically deleted in accordance with known methods of operation after a set period of time or due to the user's failure to act on the invitation, etc.

Thus in accordance with the embodiments, the server 105 obtains audio data from various mobile devices and determines the likelihood that particular users are engaged in a particular event based on an audio signature. These "events" could occur at any time across many locations. As described above, examples of events include, but are not limited to, live television broadcasts, pre-recorded television broadcasts, movies, speeches, or listening to recorded media files of those events or other recordings such as movies, music, videos, speeches, etc. Various methods of operation may be employed to check which devices are "hearing" audio from the same event. For example, in some embodiments, mobile devices known to be located near an event (such as a concert, sports game, speech, rally, etc.) may all be employed to listen to audio in a low power mode at a synchronized time, and then upload the audio data to the server 105 for comparison with those from other mobile devices. If matching audio signatures are detected, then the mobile devices providing matching audio may be included in a new event group or invited to a group. In other words, the server 105 may send a command message to the audio monitor 227 in mobile device 200 to command the audio monitor 227 to begin to collect audio data at a certain time and for a certain period of time.

For example, live television events across time zones may require that mobile devices all collect audio data at a specific time for a related time zone, and upload the audio data to the server 105, such that the grouping application 120 may check for matching audio signatures. As was discussed above, the audio data comparison may be made to a known audio signature that was generated from audio data recorded or sampled at the same time and provided to the server 105. For example, the server 105 may know that at a given broadcast time in a given time zone, a television program contains audio with a given audio signature for a given number of seconds. Therefore mobile device audio data having an appropriate timestamp may be compared to the known audio signature in an attempt to find a match. Mobile devices having the matching audio signature in their respective audio data may then be sent invitation messages to groups related to interest in the given television program.

In other embodiments, mobile devices may be employed to listen for given music audio signatures if it is determined by the server 105 that a given mobile device is in a car or other vehicle based on location information, or other context information, showing that the mobile device is travelling at high speed. In this case, mobile devices may receive a group invitation where users are found that are listening to the same song.

The server 105 may use various criteria for determining when to form mobile device groups. For example, in some embodiments, the server 105 may only define and form mobile device groups if matching samples are obtained from a certain threshold number of mobile devices. The mobile device groups of communities formed may utilize any form of social media such as, but not limited to, social "communities," social topic categories (such as a Twitter® hashtags, etc.), a chat room including video chat rooms such as, but not limited to, Google®+ Hangouts, or other social media platforms, etc. The invitation messages sent by the server 105 may be, but are not limited to, mobile device notifications, email, text messages, social network invite message, etc.

Also, in some embodiments, a user may initiate audio data collection based on the user setting up a social group or community on a social media platform (of social media or content servers 111) using a mobile device. In this case, the user may be prompted with a confirmation message from the audio monitor 227 asking the user to confirm beginning audio collection to find and invite other users attending a conference, listening to a certain song, or participating in any other number of possible "events." Upon user confirmation, the user's mobile device may then begin collecting audio data and sending it to the server 105 so that the server 105 may generate audio signatures or identify existing audio signatures and may search for other mobile device user's having the same interest based on matching audio signatures.

Figures 6, 7, 8:
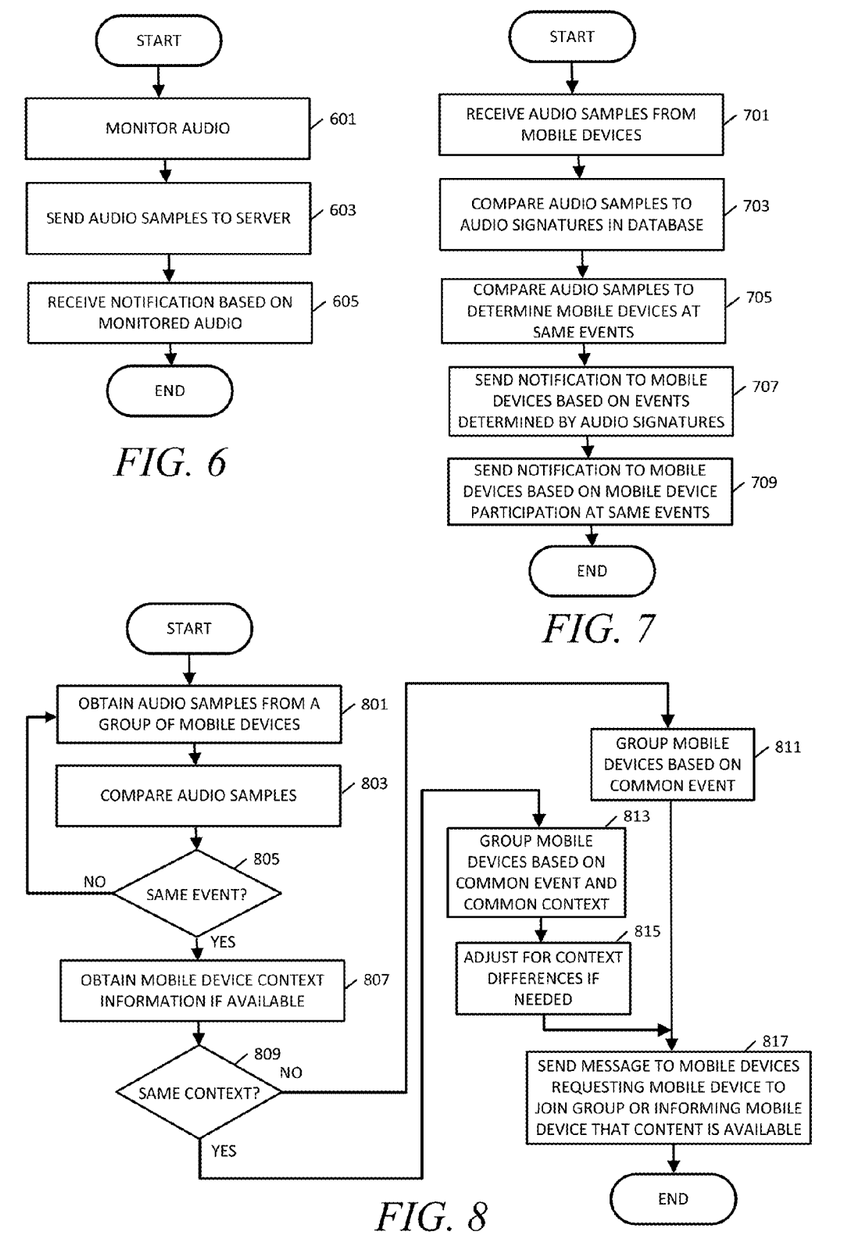
FIG. 6 is a flowchart of a method of operation of a mobile device in accordance with an embodiment.
FIG. 7 is a flowchart of a method of operation of a server in accordance with an embodiment.
FIG. 8 is a flowchart of a method of operation of a server in accordance with an embodiment.

Example methods of operation of the audio monitor 227 of mobile device 200 and the grouping application 120 on server 105 are provided in FIG. 6 through FIG. 9. FIG. 6 is a flowchart of a method of operation of mobile device 200 in accordance with an embodiment. The method of operation begins, and in operation block 601 mobile device 200 begins to monitor audio by way of the audio monitor 227, which may operate even when the mobile device 200 is in a low power state such as sleep mode. In operation block 603, the mobile device 200 sends audio data containing audio samples to the server 105, using either wireless transceiver 207 or wireless transceiver 209. In operation block 605, the mobile device 200 receives an invitation message in the form of a notification based on the monitored audio and may display the notification on the display 215. The invitation message may enable the mobile device to join a social media community, receive content, etc. The method of operation then ends.

FIG. 7 is a flowchart of a method of operation of the server 105 in accordance with an embodiment. In operation block 701, the server 105 receives audio samples from the various mobile devices. In operation block 703, server 105, and the grouping application 120 residing thereon, compares the received audio samples to audio signatures contained in the various databases such as, but not limited to, event signature database 107 or media signature database 109 or some other database containing audio signatures. As shown in operation block 705, the grouping application 120 may also compare audio samples of various mobile devices to determine if such mobile devices may be present at the same events. Thus, as was discussed above previously, the server 105 may receive other information from the mobile devices such as location data, timestamp data, or both, in order to aid in making a grouping determination based on the audio signatures. In operation block 707, the server 105 sends a notification to mobile devices considered to be participating in similar events is determined by audio signatures contained in their respective audio data. In operation block 709, the server 105 sends notification messages to mobile devices based on inferred mobile device participation at same events. The method of operation then ends as shown.

FIG. 8 is a flowchart of a method of operation of the server 105 in accordance with an embodiment. The method of operation begins, and in operation block 801, the server 105 obtains audio samples from a group of mobile devices. The audio samples obtained from the mobile devices are then compared as shown in operation block 803. In decision block 805, the server 105 attempts to determine if any of the mobile devices have similar audio signatures within their audio data such that mobile devices having matching audio signatures may be present at the same event. If not, then the method of operation returns to operation block 801 and continues to obtain audio data with audio samples from the mobile devices. If a similar or matching audio signature is found in decision block 805, then the server 105 may make a request to the given mobile devices, in operation block 807, to obtain additional context information if such context information is available.

In decision block 809, the server 105 than evaluates the context information to determine whether there is a match of context information between mobile devices (such as a location match, timestamp match, etc.). If not, then the server 105 may group mobile devices based only on the common event as shown in operation block 811, and may proceed to send invitation messages to the mobile devices inviting the mobile devices to join the group as shown in operation block 817. The method of operation then ends as shown. Otherwise, if a match of context information is found in decision block 809, then the method of operation proceeds to operation block 813. In operation block 813, the server 105 groups mobile devices based on the common event and also the common context information. In operation block 815, the server 105 may adjust for context differences if needed. For example, some mobile device context information may indicate that the user is actually participating in a live event such as a concert. However, other mobile device context information may indicate that the user is only listening to a recording of the song that was played at the live concert. For example, the song may be an MP3 file played on a stereo system within the user's home. In that case, the grouping application 120 may set up separate groups, or may set up subgroups, for people who only listen to a particular song rather than a group of people that attended the live concert. In other words, the grouping application 120 may use context information to create more than one group for mobile devices that received the same audio signature. The method of operation then proceeds to operation block 817, where the server 105 sends the invitation messages to the mobile devices. The method of operation then ends as shown.

Figure 9:
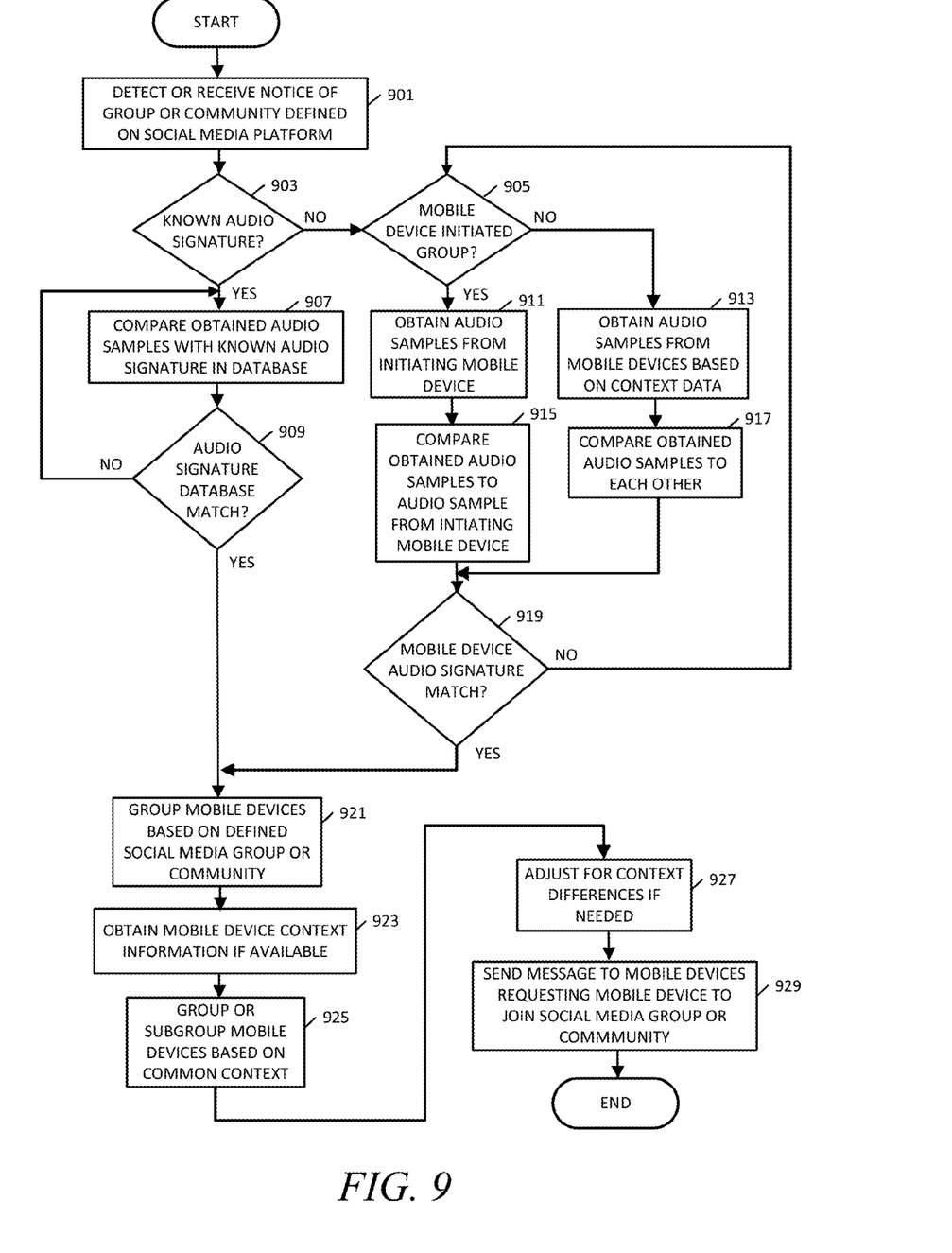
FIG. 9 is a flowchart of a method of operation of a server in accordance with an embodiment.

FIG. 9 provides another example method of operation of the server 105 and grouping application 120. As was discussed above previously, the grouping application 120 of server 105 may interact with various social media or content servers 111. In some embodiments, the server 105 may interact with the social media or content servers 111 to detect or receive notice of the group or community defined in a social media platform, or to identify content associated with an event, as shown in operation block 901. Also, in some embodiments, a mobile device user may define a group or community on one of the social media or content servers 111. In that case, the audio monitor 227 of that mobile device may provide the notice of the defined group or community, or of available content, to the server 105. After the server 105 becomes aware of the defined group or community and the pertinent social media platform or content server in operation block 901, the method of operation proceeds to decision block 903. The server 105 obtains audio data from various other mobile devices and, if a known audio signature exists in decision block 903, then the server 105 will compare obtained audio samples with that known audio signature from the appropriate database as shown in operation block 907. One example use case may involve a known media file where an audio signature for the known media file is contained in an appropriate database and can therefore be accessed and known to the server 105. In that case, a social media group or community defined in a social media platform may be associated with the existing audio signature by the server 105. However, in other embodiments, as was been mentioned above previously, a mobile device user may define a social media group or community in operation block 901. In decision block 905 therefore, the server may determine whether it is handling a mobile device initiated group or community or not. If yes, the server 105 may obtain audio samples from the initiating mobile device in operation block 911. For example, the server 105 may send a message to the audio monitor 227 of the respective mobile device such that the mobile device will display a message to the mobile device user requesting confirmation to begin obtaining audio samples. The user may respond to the query such that the mobile device audio monitor 227 may obtain audio samples at a specific time and place and send those audio samples to the server 105 in operation block 911. The server 105 may then compare audio samples obtained from other mobile devices to the audio sample obtained from the initiating mobile device in operation block 915.

However, if the server 105 determines that the group or community is not a mobile device initiated group in decision block 905, then the method of operation proceeds to operation block 913. In operation block 913, the server 105 may obtain audio samples from mobile devices based on context information such as location data and time. The server 105, in operation block 917, may then compare obtained audio samples from various mobile devices to each other. Regardless of whether the group or community has been "mobile device initiated" in decision block 905, the method of operation eventually proceeds to decision block 919 where the server 105 determines if the mobile device audio signatures match. If no audio signature matches are found, then the method of operation returns to decision block 905 and proceeds accordingly. However if a mobile device audio signature match is found in decision block 919, then the method of operation proceeds to operation block 921.

Returning briefly to decision block 903, where a known audio signature exists, the method of operation proceeds to operation block 907 where the server 105 obtains audio samples from various mobile devices and compares those audio samples with the known audio signature contained in a database. If an audio signature is found that matches the database in decision block 909, then the method of operation also proceeds to operation block 921. If no matching audio signature is found that matches the database in decision block 909, then the method of operation proceeds to operation block 907 and continues to obtain audio data from the various mobile devices.

In operation block 921, the server 105 will group mobile devices based on the defined social media group or community. In operation block 923, the server 105 may obtain mobile device contact information if it is available. This may be dependent upon privacy settings of the individual mobile devices. In operation block 925, if appropriate, the server 105 may further group or subgroup mobile devices based on common context information. In operation block 927, the server 105 may further make adjustments based on context differences between the mobile devices if needed. These context difference adjustments were discussed above previously and may include, among other things, adjustments for time, location, different languages in which media may be broadcast at different locations, or other considerations. In operation block 929, the server 105 sends invitation messages to the various mobile devices requesting the mobile device users to join the social media group or community, and the method of operation ends as shown. Each of the operations described above with respect to FIG. 9 should be understood to repeat for a number of mobile devices participating in the audio grouping search. In some embodiments, mobile devices may opt-in or opt-out of such audio signature grouping activity using a user interface to the audio monitor 227 which is accessible to the user. However, in other embodiments, the audio signature grouping may occur without any user interaction, such as when used for collecting demographic information. In embodiments using invitation messages, the only user interaction required may be accepting or rejecting invitation messages, or other messages depending on the embodiment.

That is, although the various embodiments have been described with respect to grouping mobile devices in the case of social media groups or communities, other applications of the various embodiments will occur to those of ordinary skill in the art. In other words, the ability to group mobile devices based on detected audio signatures may have various other useful applications other than grouping such mobile devices based on social media. One such application includes advertising functions wherein mobile devices receiving a common audio signature may be sent advertising messages related to interests that may coincide or correspond to the detected audio signatures. Other applications may include security system applications where detecting audio signatures on certain mobile devices may result in sending those mobile devices appropriate emergency messages instructing the user of the mobile device what to do in the particular emergency situation. Other applications will become apparent to those of ordinary skill and such other applications are contemplated by the present disclosure and remain in accordance with the disclosed subject matter and the various embodiments disclosed herein.

While various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed is:

1. A method comprising:
obtaining, from a first mobile device and a second mobile device of a plurality of mobile devices, respective audio data received by the first mobile device and respective audio data received by the second mobile device;
determining the respective audio data received by the first mobile device was generated by a first audio source associated with an event by at least comparing the respective audio data from the first mobile device to at least one stored audio signature associated with the event;
determining the respective audio data received by the second mobile device was generated by a second audio source associated with the event by at least comparing the respective audio data from the second mobile device to the at least one stored audio signature associated with the event; and
responsive to determining that the respective audio data received by the first mobile device and the respective audio data received by the second mobile device was generated by two different audio sources associated with the same event, grouping the first and second mobile devices in a mobile device group related to the event, wherein the second audio source is different from the first audio source and the first and second audio sources are each selected from a group consisting of live audio from the event, a television broadcast of the event, a radio broadcast of the event, an Internet broadcast of the event, and a playback of a media file associated with the event.

2. The method of claim 1, wherein grouping the first and second mobile devices together in the mobile device group comprises sending a respective invitation message to each of the first and second mobile devices to join the mobile device group.

3. The method of claim 1, further comprising:
providing, to each mobile device in the mobile device group, content related to the event.

4. The method of claim 1, further comprising:
obtaining context information from each mobile device in the mobile device group; and
subdividing, based on the context information, the mobile device group into at least a first and a second mobile device subgroup.

5. The method of claim 4, wherein the context information comprises at least one of timestamp information from the respective audio data received by the first mobile device and the respective audio data received by the second mobile device, location information from the first mobile device that is related to a location of the first audio source, or location information from the second mobile device that is related to a location of the second audio source.

6. The method of claim 1, further comprising:
obtaining the at least one audio signature associated with the event by at least accessing a database of events.

7. The method of claim 1, wherein grouping the first and second mobile devices in the mobile device group related to the event comprises:
creating, on a social media platform, the mobile device group related to the event; and
sending, to each of the first and second mobile devices, a respective invitation message to join the mobile device group on the social media platform.

8. The method of claim 1, wherein the respective audio data obtained from the first mobile device was generated by the first audio source during the event and the respective audio data obtained from the second mobile device was generated by the second audio source after the event.

9. The method of claim 1, wherein the respective audio received by the first mobile device was received by the first mobile device at a first location and the respective audio received by the second mobile device was received by the second mobile device at a second location that is different than the first location.

10. A server comprising:
at least one processor; and
at least one module operable by the at least one processor to:
obtain, from a first mobile device and a second mobile device of a plurality of mobile devices, respective audio data received by the first mobile device and respective audio data received by the second mobile device;
determine the respective audio data received by the first mobile device was generated by a first audio source associated with an event by at least comparing the respective audio data to at least one stored audio signature associated with the event;
determine the respective audio data received by the second mobile device was generated by a second audio source associated with the event by at least comparing the respective audio data from the second mobile device to the at least one stored audio signature associated with the event; and
responsive to determining that the respective audio data received by the first mobile device and the respective audio data received by the second mobile device was generated by two different audio sources associated with the same event, group the first and second mobile devices in a mobile device group related to the event, wherein the second audio source is different from the first audio source and the first and second audio sources are each selected from a group consisting of live audio from the event, a television broadcast of the event, a radio broadcast of the event, an Internet broadcast of the event, and a playback of a media file associated with the event.

11. The server of claim 10, wherein the at least one module is operable by the at least one processor to group the first and second mobile devices in the mobile device group by at least sending an invitation message to each of the first and second mobile devices to join the mobile device group.

12. The server of claim 10, wherein the at least one module is operable by the at least one processor to:
provide, to each mobile device in the mobile device group, content related to the event.

13. The server of claim 10, wherein the at least one module is operable by the at least one processor to:
obtain context information from each mobile device in the mobile device group; and
subdivide, based on the context information, the mobile device group into at least a first and a second mobile device subgroup.

14. The server of claim 13, where the context information comprises at least one of timestamp information from the respective audio data received by the first mobile device and the respective audio received by the second mobile device, location information the first mobile device that is related to a location of the first audio source, or location information from the second mobile device that is related to a location of the second audio source.

15. The server of claim 10, wherein the at least one module is further operably by the at least one processor to obtain the at least one audio signature associated with the event by at least accessing a database of events.

16. The server of claim 1, wherein the at least one module is further operable by the at least one processor to group the first and second mobile devices in the mobile device group related to the event by at least:
creating, on a social media platform, the mobile device group related to the event; and sending, to each of the first and second mobile devices, a respective invitation message to join the mobile device group on the social media platform.

17. A method comprising:
receiving, by a first mobile device, first audio data generated by a first audio source associated with an event;
sending, by the first mobile device, to a server, the first audio data; and
responsive to sending the first audio data to the server, receiving, by the first mobile device, from the server, information related to a mobile device group formed by the server at least partially based on a determination that the first audio data matches at least one audio signature associated with the event, wherein:
the mobile device group comprises at least one second mobile computing device that received second audio data generated by a second audio source associated with the event,
the second audio source is different from the first audio source; and
the first and second audio sources are each selected from a group consisting of live audio from the event, a television broadcast of the event, a radio broadcast of the event, an Internet broadcast of the event, playback of a media file associated with the event.

18. The method of claim 17, wherein the information related to the mobile device group comprises an invitation message to join the mobile device group.

19. The method of claim 18, wherein the invitation message is an invitation message to join the mobile device group on a social media platform.

20. The method of claim 17, wherein the information related to the mobile device group comprises content related to the event.

21. The method of claim 17, wherein the first audio data was generated by the first audio source during the event and the second audio data was generated by the second audio source after the event.

22. The method of claim 17, wherein the first audio data was generated by the first audio source after the event and the second audio data was generated by the second audio source during the event.

23. A first mobile device comprising:
at least one processor; and
at least one module operable by the at least one processor to:
receive first audio data generated by a first audio source associated with an event;
send, to a server, the first audio data; and
responsive to sending the first audio data to the server, receive, from the server, information related to a mobile device group formed by the server at least partially based on a determination that the first audio data matches at least one audio signature associated with the event, wherein:
the mobile device group comprises at least one second mobile computing device that received second audio data generated by a second audio source associated with the event,
the second audio source is different from the first audio source; and
the first and second audio sources are each selected from a group consisting of live audio from the event, a television broadcast of the event, a radio broadcast of the event, an Internet broadcast of the event, playback of a media file associated with the event.

24. The first mobile device of claim 23, wherein the information related to the mobile device group comprises an invitation message to join the mobile device group.

25. The first mobile device of claim 23, wherein the invitation message is an invitation message to join the mobile device group on a social media platform.

26. The first mobile device of claim 23, wherein the information related to the mobile device group comprises content related to the event.

* * * * *